(12) United States Patent
Bergfeld

(10) Patent No.: US 11,841,717 B2
(45) Date of Patent: Dec. 12, 2023

(54) PRESSURE CONTROL VALVE AND DEVICE COMPRISING SUCH A PRESSURE CONTROL VALVE, FOR CONTROLLING OR REGULATING THE PRESSURE OF A COMPRESSED FLUID IN A PILOT PRESSURE CHAMBER

(71) Applicant: KENDRION (VILLINGEN) GMBH, Villingen-Schwenningen (DE)

(72) Inventor: Bjorn Bergfeld, Balingen-Endingen (DE)

(73) Assignee: KENDRION (VILLINGEN) GMBH, Villingen-Schwenningen (DE)

( * ) Notice: Subject to any disclaimer, the term of this patent is extended or adjusted under 35 U.S.C. 154(b) by 343 days.

(21) Appl. No.: 17/421,155

(22) PCT Filed: Jan. 9, 2020

(86) PCT No.: PCT/EP2020/050375
§ 371 (c)(1),
(2) Date: Jul. 7, 2021

(87) PCT Pub. No.: WO2020/144254
PCT Pub. Date: Jul. 16, 2020

(65) Prior Publication Data
US 2022/0083082 A1    Mar. 17, 2022

(30) Foreign Application Priority Data

Jan. 9, 2019   (DE) .................... 10 2019 100 409.8
Mar. 6, 2019   (DE) .................... 10 2019 105 707.8

(51) Int. Cl.
*G05D 16/00*    (2006.01)
*G05D 16/18*    (2006.01)
(Continued)

(52) U.S. Cl.
CPC ............ *G05D 16/187* (2019.01); *F16F 9/34* (2013.01); *F16F 9/464* (2013.01); *F16K 1/44* (2013.01);
(Continued)

(58) Field of Classification Search
CPC ....... G05D 16/187; G05D 16/101; F16F 9/34; F16F 9/464; F16F 9/44; F16K 1/44;
(Continued)

(56) References Cited

U.S. PATENT DOCUMENTS 3,771,761 A * 11/1973 Standke .............. F16K 31/0655
                                                                251/129.12
4,085,921 A *  4/1978 Ueda ................... F16K 31/0658
                                                                251/129.08
(Continued)

FOREIGN PATENT DOCUMENTS

EP    2678581 B1    7/2015

OTHER PUBLICATIONS

German office action dated Sep. 10, 2019, in corresponding priority application 10 2019 105 707.8.

*Primary Examiner* — Phutthiwat Wongwian
*Assistant Examiner* — Sherman D Manley
(74) *Attorney, Agent, or Firm* — Nath, Goldberg & Meyer; Jerald L. Meyer

(57) ABSTRACT

A pressure control valve for controlling or regulating a pressure of a compressed fluid in a pilot pressure chamber includes a valve housing with at least one inlet which is fluidically connectable to the pilot pressure chamber, at least one outlet, a tappet mounted in the valve housing to be moved along a longitudinal axis by means of an actuation device that can be energized, and a first seal element which is mounted in the valve housing to move along the longitudinal axis and which is preloaded into a closed position by
(Continued)

means of a first spring. The first seal element rests against a first valve seat in the closed position. The first seal element has a passage through which the compressed fluid can flow. A second seal element is secured to the tappet and can be moved by the energization of the actuation device.

20 Claims, 4 Drawing Sheets

(51) Int. Cl.
    *G05D 16/10*       (2006.01)
    *F16F 9/34*        (2006.01)
    *F16F 9/46*        (2006.01)
    *F16K 1/44*        (2006.01)
    *F16K 15/18*       (2006.01)
    *F16K 17/04*       (2006.01)
    *F16K 17/168*     (2006.01)
    *F16K 31/06*       (2006.01)

(52) U.S. Cl.
    CPC ............ *F16K 15/18* (2013.01); *F16K 17/048* (2013.01); *F16K 17/168* (2013.01); *F16K 31/0606* (2013.01); *F16K 31/0655* (2013.01); *F16K 31/0693* (2013.01); *G05D 16/101* (2019.01)

(58) Field of Classification Search
    CPC ...... F16K 15/18; F16K 17/048; F16K 17/168; F16K 31/0606; F16K 31/0655; F16K 31/0693
    See application file for complete search history.

(56) References Cited

U.S. PATENT DOCUMENTS

| | | | | |
|---|---|---|---|---|
| 4,151,862 A * | 5/1979 | Ueda | ............... | F23N 5/143 251/129.08 |
| 4,782,862 A * | 11/1988 | Nguyen | ............... | F16K 31/0693 251/129.01 |
| 4,911,403 A * | 3/1990 | Lockwood, Jr. | ......... | F17C 13/04 251/210 |
| 5,007,614 A * | 4/1991 | Lockwood, Jr. | ......... | F16K 15/18 251/210 |
| 5,083,546 A * | 1/1992 | Detweiler | .......... | F02M 25/0836 137/907 |
| 5,325,830 A * | 7/1994 | Hammer | ................. | F16K 1/443 137/627.5 |
| 5,390,703 A * | 2/1995 | Tengesdal | ............. | F16K 39/024 137/629 |
| 5,467,749 A * | 11/1995 | Meiwes | ................... | F02M 3/07 123/339.27 |
| 5,722,367 A * | 3/1998 | Izydorek | ................. | F02M 3/09 251/30.03 |
| 5,769,119 A * | 6/1998 | Edenfield | ................ | F16K 15/18 251/215 |
| 6,065,447 A * | 5/2000 | Saeki | ..................... | F02M 69/32 123/339.27 |
| 6,612,338 B2 * | 9/2003 | Weldon | ................... | F16K 3/265 137/589 |
| 6,651,953 B2 * | 11/2003 | Weldon | ................... | F16K 24/04 251/129.21 |
| 7,383,860 B2 * | 6/2008 | Haines | .................... | F16K 1/526 137/630.22 |
| 7,798,173 B2 * | 9/2010 | Feigel | .................. | B60T 8/3665 137/630.22 |
| 8,667,986 B2 * | 3/2014 | Roth | ................... | F02M 63/0225 137/508 |
| 9,151,354 B2 * | 10/2015 | Ewers | ..................... | F16F 9/464 |
| 9,369,031 B2 * | 6/2016 | Sackl | .................... | H01F 7/1615 |
| 9,551,997 B2 * | 1/2017 | Bergfeld | ............. | F16K 31/0648 |
| 10,677,372 B2 * | 6/2020 | Maiwald | ............ | F02M 63/0035 |
| 11,028,808 B2 * | 6/2021 | Okamura | ................ | F16K 1/523 |
| 2006/0214126 A1 * | 9/2006 | Kimble | ............... | F16K 31/0655 251/129.21 |
| 2006/0272712 A1 * | 12/2006 | Sontag | ................ | F16K 31/0655 137/554 |
| 2007/0235671 A1 * | 10/2007 | Feigel | ................ | F16K 31/0627 251/129.01 |
| 2020/0408324 A1 * | 12/2020 | Bonanno | ............... | H01F 7/1607 |

* cited by examiner

PRESSURE CONTROL VALVE AND DEVICE COMPRISING SUCH A PRESSURE CONTROL VALVE, FOR CONTROLLING OR REGULATING THE PRESSURE OF A COMPRESSED FLUID IN A PILOT PRESSURE CHAMBER

This is a National Phase Application filed under 35 U.S.C. 371 as a national stage of PCT/EP2020/050375, filed Jan. 9, 2020, an application claiming the benefit of German Application No. 10 2019 100 409.8 filed Jan. 9, 2019; and German Application No. 10 2019 105 707.8 filed Mar. 6, 2019, the content of each of which is hereby incorporated by reference in its entirety.

The present invention relates to a pressure control valve for controlling or regulating a pressure of a compressed fluid in a pilot pressure chamber. The invention also relates to a device with such a pressure control valve, with which the pressure of the compressed fluid in the pilot pressure chamber can be regulated.

Hydraulic fluids or compressed air are usually used as compressed fluids. Pilot pressure chambers in hydraulically or pneumatically operated devices are used to control or regulate pilot-operated valves, often also designed as hydraulic or pneumatic sliders. If pilot-operated valves are designed as proportional valves or proportional sliders, the volume flows that flow through the proportional valve or the proportional slider can be continuously adjusted with the pressure in the pilot pressure chamber within certain limits.

An example of such hydraulically or pneumatically operated devices is vibration dampers in motor vehicles, in which the damping characteristic depends on the volume flow of the compressed fluid used flowing through the proportional valve. Depending on the volume flow, a more comfort-oriented, softer damping or a more sporty, harder damping can be set. In the case of vibration dampers, an actuation device that can be energized is used, with which several damping characteristics can be specified by the driver or automatically set by an on-board computer depending on the driving condition of the motor vehicle or the condition of the ground covering along which the motor vehicle is currently moving. However, it must be ensured that in the event of a failure of the electrical energy and consequently the failure of the actuation device, a fail-safe device, also referred to as a "failsafe", is available. This ensures that the vehicle can continue to be operated with a certain damping characteristic even in the event of a failure of the electrical energy. A medium damping characteristic that is neither too hard nor too soft is usually aimed for here.

These requirements result in a relatively complex structure of the device, in particular the vibration damper, as can be seen, for example, from US 2016/0091044 A1 and WO 2016/066314 A1. The structure becomes particularly complex because several sliders have to be used. Further vibration dampers are disclosed in US 2016/0369862 A1, JP 2009-115319 A, U.S. Pat. No. 5,147,018 A, WO 2011/023351 A1 and US 2005/0016086 A1. In particular, the vibration damper disclosed in EP 2 678 581 B1 also offers a medium damping characteristic in "fail-safe" mode.

The object of one embodiment of the present invention is to provide a pressure control valve for regulating a pressure of a compressed fluid in a pilot pressure chamber, which is simple in structure and regulates the pressure in the pilot pressure chamber to a determinable level even when there is no electrical energy to energize the actuation device. Furthermore, one embodiment of the present invention is based on the object of creating a device, with which the pressure of the compressed fluid in the pilot pressure chamber can be regulated and which can be operated with such a pressure control valve.

This object is achieved with the features specified in claims 1 and 17. Advantageous embodiments are the subject of the dependent claims.

One embodiment of the invention relates to a pressure control valve for regulating a pressure of a compressed fluid in a pilot pressure chamber, comprising
  a valve housing with at least one inlet, which can be fluidically connected to the pilot pressure chamber, and at least one outlet,
  a tappet, which is mounted in the valve housing so as to be movable along a longitudinal axis by means of an actuation device that can be energized,
  a first seal element, which is movably mounted along the longitudinal axis in the valve housing and is preloaded by means of a first spring into a closed position, in which the first seal element rests against a first valve seat, the first seal element having a passage through which the compressed fluid can flow,
  a second seal element, which is secured to the tappet and, by energizing the actuation device, can be moved by means of the tappet along the longitudinal axis between a first position, in which the second seal element rests against the first seal element and closes the passage, and a second position, in which the second seal element rests against a second valve seat, the second valve seat being arranged axially offset to the first valve seat with respect to the longitudinal axis, and
  a second spring, which preloads the second seal element into the first position.

The essential property of the proposed pressure control valve is that it has at least two valve seats, through which the compressed fluid can flow when the valve seat in question is open. The pressure control valve is designed in such a way that the compressed fluid can flow through the pressure control valve when at least one of the valve seats is open. In this respect, the first valve seat and the second valve seat are connected in parallel to one another in relation to the opening behavior.

While the second valve seat can be opened and closed directly or indirectly as a result of the actuation device being energized and the resulting movement of the second seal element, the first valve seat is opened due to the pressure acting in the pressure control valve. In other words, the second valve seat is actively opened by the energization, while the first valve seat is passively opened due to the prevailing pressure conditions. The second spring ensures that the passage is closed if the actuation device fails.

This has the consequence that even if the electrical energy for energizing the actuation device is not available, a flow through the pressure control valve is possible. The pressure in the pilot pressure chamber can therefore be controlled or regulated even if the power supply fails, so that a fail-safe device, also referred to as a "failsafe", can be provided with just a single pressure control valve. The damping characteristics that arise in the case of the fail-safe are determined by the choice of the spring constant and the spring preload of the first spring.

The pressure control valve can also be closed when the second seal element is in the second position and the second seal element rests against the second valve seat. Then, however, no flow through the pressure control valve and therefore no control or regulation of the pressure in the pilot pressure chamber is possible, so that the second seal element is usually not moved into the second position when the pressure control valve is in operation.

The first valve seat and the second valve seat are arranged axially offset from one another with respect to the longitudinal axis in order to be able to ensure the movability of the second seal element along the longitudinal axis. The provision of the second seal element for throttling enables the opening points and the desired damping characteristics to be set very precisely. In the pressure control valve disclosed in EP 2 678 581 B1, the throttling and the opening and closing of the valve seats are carried out with the tappet. The pressure control valve shown there does not have a second seal element. As a result, the desired damping characteristic cannot be set as precisely as with the present pressure control valve. In addition, with the present pressure control valve, the damping characteristics can be changed in a simple manner by using a second seal element with different dimensions. In the case of the pressure control valve disclosed in EP 2 678 581 B1, the entire tappet has to be changed for this, which is significantly more complex.

According to a further embodiment, the passage is formed by an annular gap between the first seal element and the tappet. In this embodiment, the passage can be implemented in a structurally simple manner.

According to a further embodiment, the second valve seat is formed by a tube connected to the valve housing. In particular, if structural changes are to be made to the pressure control valve that require a different positioning of the second valve seat, only the diameter and/or the length of the tube need to be changed. The valve housing itself can remain unchanged.

According to a further developed embodiment, the tube is connected to the valve housing to be moved along the longitudinal axis. It is advisable to connect the tube to the valve housing by means of a frictional connection, for example by means of a certain oversize in relation to the valve housing, so that the position of the second valve seat is clearly retained when the pressure control valve is in operation. However, the frictional connection can be overcome with suitable tools during the assembly of the pressure control valve, so that the position of the second valve seat can be adjusted. The position of the second valve seat in turn influences the opening points of the pressure control valve. In this way, magnetic forces, which can be different as a result of tolerance differences, can be standardized. Opening points that deviate from the target value due to manufacturing tolerances can be corrected in a relatively simple manner.

In a further developed embodiment, the cross-sectional area of the annular gap can be larger than the cross-sectional area of a throttle gap emanating from the second seal element or from the tappet. The above-mentioned control or regulation of the pressure in the pilot pressure chamber takes place essentially by throttling the flow of the compressed fluid in the pressure control valve. The amount of throttling is determined by the smallest cross section through which fluid can flow. When flowing through the pressure control valve, the compressed fluid passes essentially two cross-sections, namely on the one hand the annular gap and on the other hand the throttle gap formed by the second seal element or the tappet. While the annular gap is structurally predetermined and its cross-sectional area cannot be changed, the cross-sectional area of the throttle gap can be changed as a result of a stronger or less strong energization of the actuation device. Due to the fact that the cross-sectional area of the throttle gap in every position of the tappet is smaller than the cross-sectional area of the annular gap or the passage, it is ensured that the pressure in the pilot pressure chamber can be changed by energizing the actuation device.

According to a further developed embodiment, the cross-sectional area of the annular gap is larger than the cross-sectional area
of the first throttle gap formed between the second seal element and the second valve seat, or
of the second throttle gap formed between the second seal element and the valve housing, or
of the third throttle gap formed between the second seal element and the first seal element.

If the second seal element is located between the first position and the second position, the compressed fluid is initially directed radially outward by the second seal element, seen in the flow direction, then parallel to the longitudinal axis and then radially inward again. If the compressed fluid flows radially outward, it flows through a first throttle gap running parallel to the longitudinal axis. When flowing parallel to the longitudinal axis, the compressed fluid flows through a second throttle gap, whereas it flows through a third throttle gap when flowing radially inward. The first throttle gap is formed between the second seal element and the second valve seat. The second throttle gap is formed between the second seal element and the valve housing or a component inserted into the valve housing, whereas the third throttle gap is formed between the second seal element and the first seal element.

Depending on the position of the second seal element, the cross sections of the first and the third throttle gap change. The throttle gap which has the smallest cross-sectional area should be referred to as the active throttle gap, since this determines the degree of throttling of the flow of the compressed fluid. The pressure control valve is designed in such a way that, regardless of the position of the tappet, the cross-sectional area of the annular gap is larger than the cross-sectional area of the active throttle gap. As a result, it is ensured that the pressure in the pilot pressure chamber can be changed by energizing the actuation device.

According to a further developed embodiment, the cross-sectional area of the annular gap is larger than the cross-sectional area
of the first throttle gap formed between the tappet and the second valve seat, or
of the second throttle gap formed between the second seal element and the valve housing, or
of the third throttle gap formed between the second seal element and the first seal element.

In this embodiment, the first throttle gap is formed between the tappet and the second valve seat and not between the second seal element and the second valve seat. In this embodiment, the size of the cross-sectional area of the first throttle gap is determined by the tappet, while the size of the cross-sectional area of the second and the third throttle gap are determined by the second seal element. In this respect, two different elements are used for throttling. In this embodiment, the design leeway is greater, since the first throttle gap can be set independently of the second seal element with the length of the tappet.

In a further developed embodiment, the second sealing seat can be enclosed by the first sealing seat. This results in a very compact design of the pressure control valve.

According to a further embodiment, the pressure control valve is designed as a proportional valve. In this embodiment, the volume flow through the pressure control valve can be regulated in the following way: As mentioned, the second seal element can be moved back and forth between the first position and the second position by means of the actuation device. The proportional valve is designed in such a way that the throttle gap changes linearly, so that the volume flow is also changed linearly. The pressure in the pilot pressure chamber can therefore be controlled proportionally to the energization of the actuation device.

In a further embodiment, the second seal element can be designed as a spring plate. In this embodiment, the second seal element is sufficiently stable on the one hand with a small wall thickness, and on the other hand it is comparatively easy to manufacture.

According to a further developed embodiment, the second seal element is connected to the tappet by means of a clearance fit. This allows tolerances to be compensated for in a simple manner.

A further developed embodiment is characterized in that the spring plate is press-fit on the tappet. In this way, sufficient fastening of the spring plate on the tappet can be achieved in a simple manner.

According to a further embodiment, the spring plate is secured to the tappet by means of a driver element. The driver element can allow a comparatively great movability of the spring plate along the longitudinal axis, whereby error tolerances can be compensated for.

According to a further developed embodiment, the driver element is secured to the tappet in such a way that the first throttle gap is formed between the driver element and the second valve seat. Depending on the desired opening behavior, the driver element can easily be exchanged for another driver element with which the first throttle gap becomes larger or smaller. A given pressure control valve can consequently be designed flexibly and with little constructive effort for different damping characteristics.

According to a further embodiment, the actuation device comprises a magnet through which the compressed fluid can flow. Actuation devices which use magnets to move a tappet are widespread, so that such actuation devices can be used when manufacturing the present pressure control valve. If the compressed fluid can flow through the magnet, however, there is the advantage that the compressed fluid acts as a coolant, since it can dissipate at least some of the heat that is generated during operation of the magnet from the magnet. This reduces the thermal load on the magnet and increases its durability.

One embodiment of the invention relates to a device for controlling or regulating a pressure in a pilot pressure chamber, comprising a primary circuit for a compressed fluid,
  a working machine arranged in the primary circuit for conveying the compressed fluid in the primary circuit along a conveying direction,
  a hydraulic or pneumatic slider,
  a secondary circuit for the compressed fluid,
    which starts from a branch of the primary circuit, which branch is arranged downstream of the working machine with respect to the conveying direction, and which flows back into the primary circuit at a confluence,
  a pilot pressure chamber arranged in the secondary circuit, and
  a pressure control valve according to one of the previous embodiments, arranged between the pilot pressure chamber and the confluence in the secondary circuit, wherein
    the slider is arranged and designed so that the slider can block or unblock the flow of the compressed fluid in the primary circuit between the branch and the confluence depending on the pressure in the pilot pressure chamber.

The advantages and technical effects that can be achieved with the proposed device correspond to those that have been explained with the pressure control valve according to one of the previously discussed embodiments. In summary, it should be pointed out that with only one pressure control valve and only one slider, both active and passive regulation of the pressure in the pilot pressure chamber can be achieved and the structural complexity of the device can be kept low.

According to a further embodiment, the slider is designed as a proportional slider. In a closed position, the slider blocks the primary circuit between the branch and the confluence depending on the pressure in the pilot pressure chamber. In this case, the compressed fluid can only flow from the branch to the confluence via the secondary circuit. As soon as the pressure in the pilot pressure chamber has exceeded or fallen short, depending on the design of the device, the slider is moved into an open position so that the fluid can also flow between the branch and the confluence in the primary circuit. However, simple sliders can only be moved between the open position or the closed position, so that the flow of the compressed fluid between the branch and the confluence in the primary circuit is either completely unblocked or blocked. However, if the slider is designed as a proportional slider, the volume flow of the compressed fluid between the branch and the confluence in the primary circuit can be adjusted depending on the pressure in the pilot pressure chamber. Since the pressure in the pilot pressure chamber can in turn be adjusted with the energization of the actuation device, the volume flow of the compressed fluid between the branch and the confluence in the primary circuit can accordingly also be adjusted with the energization of the actuation device and at the same time a fail-safe will be realized in the event that the actuation device fails.

Another embodiment is characterized in that the actuation device of the pressure control valve comprises a magnet through which the compressed fluid can flow and the magnet is fluidically connected to the pilot pressure chamber or to an external compressed fluid circuit. As mentioned, actuation devices which use magnets to move a tappet are widespread, so that such actuation devices can be used. If the compressed fluid can flow through the magnet, however, there is the advantage that the compressed fluid acts as a coolant, since it can dissipate at least some of the heat that is generated during operation of the magnet from the magnet. This reduces the thermal load on the magnet and increases its durability.

If the magnet is fluidically connected to the pilot pressure chamber, the pressure prevailing there can be used as the delivery pressure for the compressed fluid, so that no further delivery elements have to be used. The construction of the device is not significantly complicated. In the event that the magnet is fluidically connected to an external compressed fluid circuit, the volume flow through the magnet can be changed independently of the volume flow and the pressure conditions in the secondary circuit.

Another embodiment is characterized in that the working machine is a pump, a compressor, or a vibration damper. The vibration dampers can be designed as two-tube or three-tube vibration dampers. Such working machines can be controlled or regulated particularly well in a simple manner by means of the proposed device as a result of the regulation in the pilot pressure chamber. In the event that the working machine is designed as a vibration damper, the damping characteristics can be adjusted by energizing the actuation device so that harder or softer damping results. If the actuation device fails, damping is also ensured, which depends on the spring preload and the spring constant of the first spring.

Exemplary embodiments of the invention are explained in more detail below with reference to the accompanying drawings. In the drawings.

Figure 2:
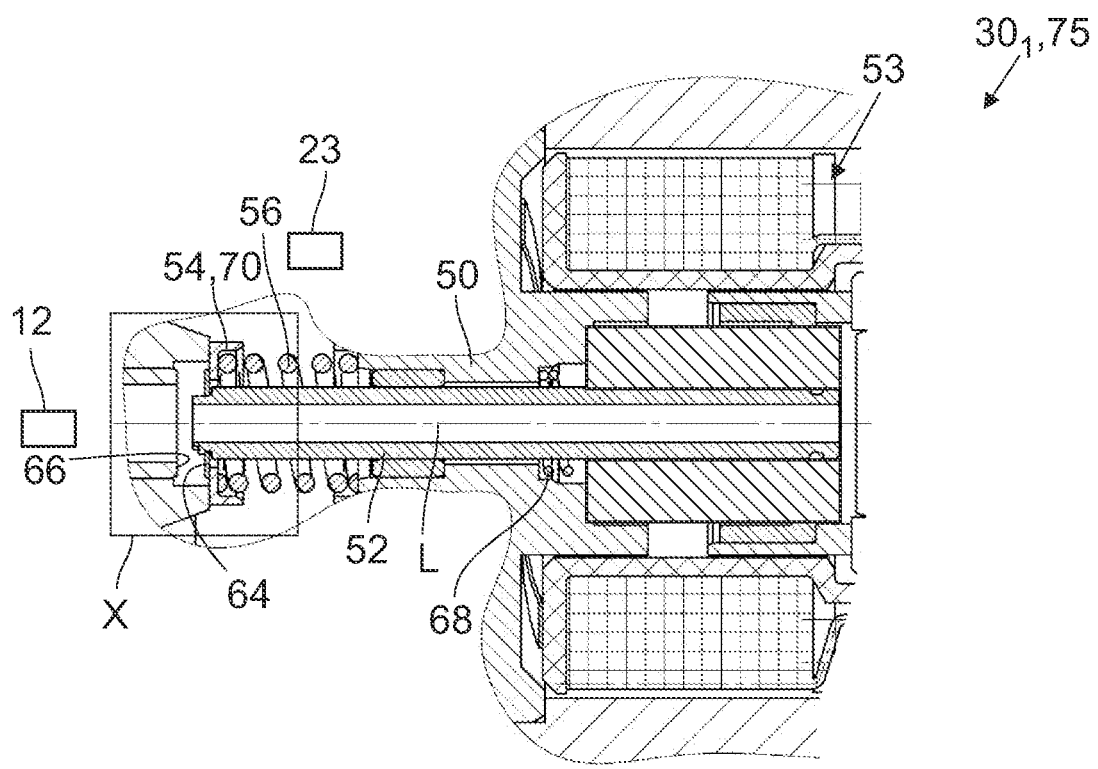
FIG. 2 is a partial sectional view through a first embodiment of a proposed pressure control valve.
Figure 4:
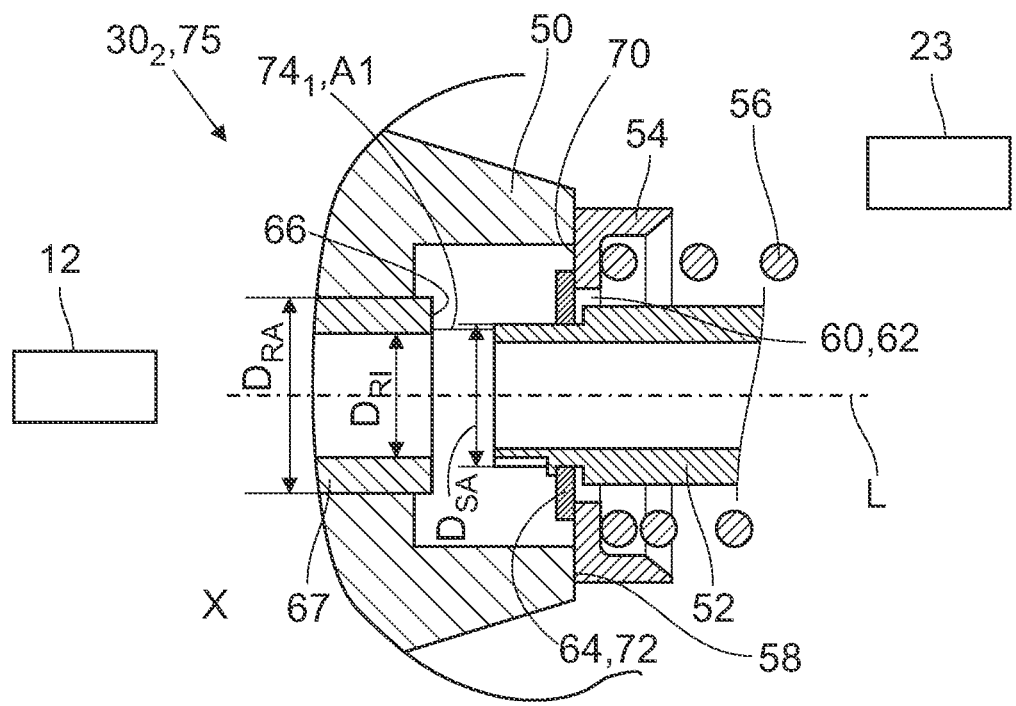
Figure 5:
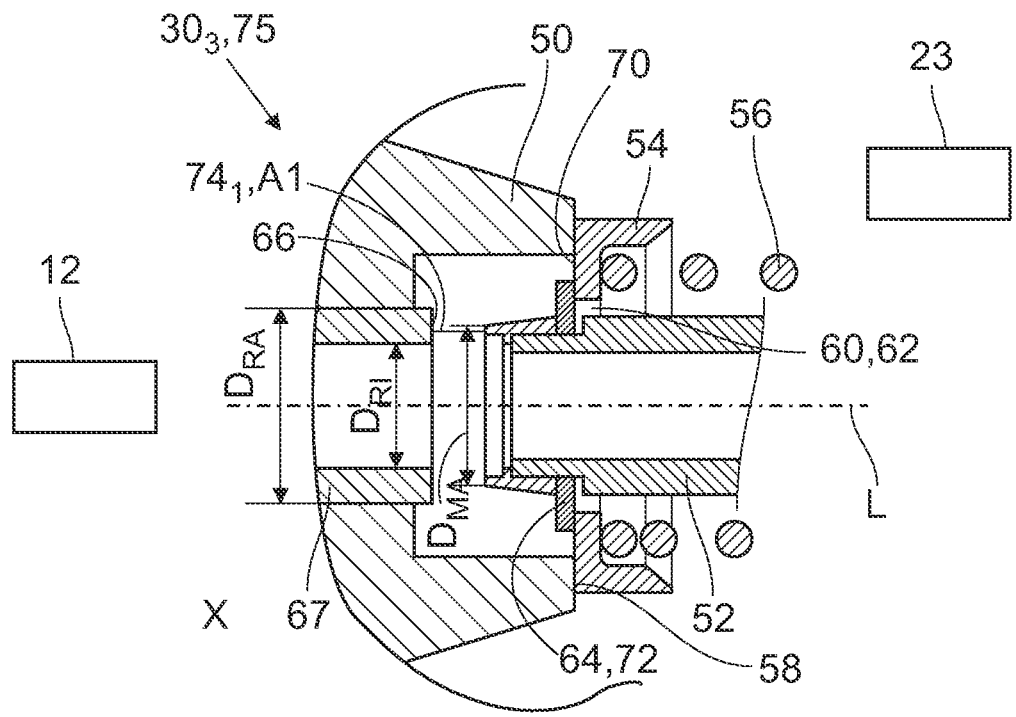

FIG. 4 shows a basic and not-to-scale enlarged illustration, analogous to the section X marked in FIG. 2 of a second embodiment of the proposed pressure control valve, in which the pressure control valve is in the first operating condition; and FIG. 5 shows a basic and not-to-scale enlarged illustration, analogous to the section X marked in FIG. 2 of a third embodiment of the proposed pressure control valve, in which the pressure control valve is in the first operating condition.

Figure 1:
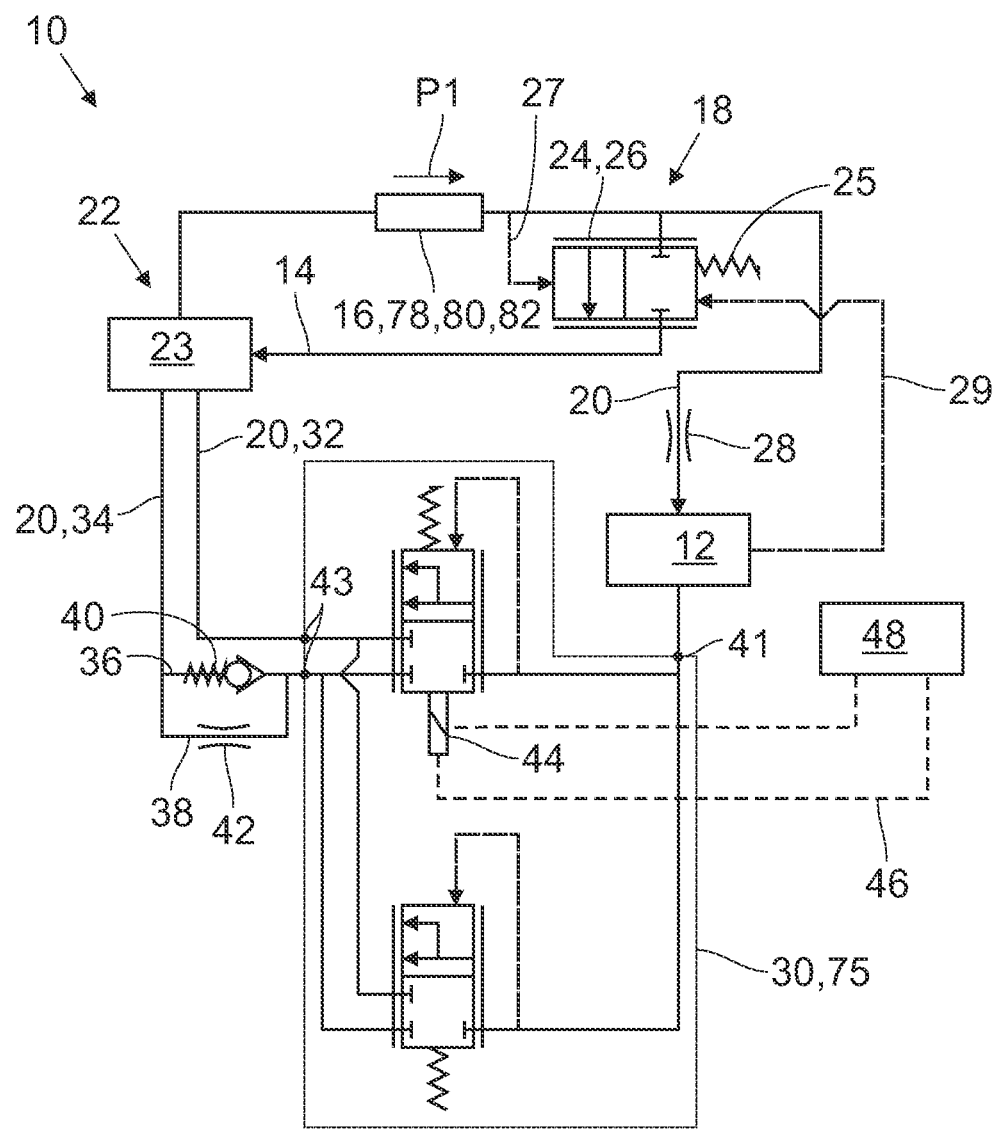
FIG. 1 is a circuit diagram of an embodiment of a proposed device for controlling or regulating a pressure of a compressed fluid in a pilot pressure chamber.

FIG. 1 shows a circuit diagram of a device 10 for controlling or regulating a pressure of a compressed fluid in a pilot pressure chamber 12. A hydraulic fluid or compressed air can be used as the compressed fluid, the following description relating to a compressed fluid which is designed as a hydraulic fluid. The device 10 comprises a primary circuit 14 in which the compressed fluid can be conveyed by means of a working machine 16. A working machine 16 is to be understood as a component with which, in particular, mechanical work can be transferred to the compressed fluid in such a way that it is conveyed in the primary circuit 14 in the conveying direction indicated by the arrow P1.

In relation to the conveying direction indicated by the arrow P1, a branch 18 is arranged downstream of the working machine 16, from which a secondary circuit 20 emanates, through which the compressed fluid can likewise flow. The exact configuration of the secondary circuit 20 will be discussed in greater detail later.

Downstream of the branch 18, a confluence 22 is provided in the primary circuit 14, at which the secondary circuit 20 opens again into the primary circuit 14. In the example shown, the confluence 22 is realized by means of a low-pressure chamber 23.

Starting from the low-pressure chamber 23, the primary circuit 14 flows back into the working machine 16.

As can be seen from FIG. 1, a slider 24 is arranged downstream of the branch 18, which in the illustrated embodiment is designed as a proportional slider 26 which interacts with a spring 25. The secondary circuit 20 cannot be blocked by the slider 24. The slider 24 is adjustable between two positions, wherein in a first position, which is shown in FIG. 1, the slider 24 blocks the primary circuit 14 between the branch 18 and the confluence 22. In the second position, on the other hand, there is the fluid connection between the branch 18 and the confluence 22 in the primary circuit 14. The slider 24 is designed as a 2/2 valve.

The spring 25 interacts with the slider 24 in such a way that it is preloaded into the first position. A first control line 27, which is connected to the slider 24, extends between the working machine 12 and the branch 18. Furthermore, a second control line 29 extends from the pilot pressure chamber and, like the first control line 27, is also connected to the slider 24. The compressed fluid conveyed to the slider 24 via the first control line 27 acts in the opposite direction on the slider 24 compared to the compressed fluid conveyed via the second control line 29 to the slider 24. The compressed fluid conveyed to the slider 24 via the second control line 29 acts in the same direction as the spring 25.

Starting from the branch 18, a throttling main orifice 28 is provided downstream of the slider 24 in the secondary circuit 20. The secondary circuit 20 then opens into the already mentioned pilot pressure chamber 12. One goes from the pilot pressure chamber 12 Downstream from the pilot pressure chamber 12 a pressure control valve 30 is arranged, the function of which can be understood as a solenoid-controlled 3/2 valve and a purely hydraulically controlled 3/2 valve connected in parallel thereto. The exact structural design of the pressure control valve 30 will be discussed in greater detail later.

Downstream of the pressure control valve 30, a first line 32 runs directly to the low-pressure chamber 23, while a second line 34 splits into a first sub-line 36 and a second sub-line 38, with a check valve 40 arranged in the first sub-line 36 and a secondary orifice 42 in the second sub-line 38. The check valve 40 and the secondary orifice 42 are connected in parallel to one another. Downstream of the check valve 40 and the secondary orifice 42, the first sub-line 36 and the second sub-line 38 merge again. From there, the second line 34, like the first line 32, leads to the low-pressure chamber 23. As already mentioned, the secondary circuit 20 in the low-pressure chamber 23 opens again into the primary circuit 14.

As already mentioned, the proposed pressure control valve 30 can be understood in terms of its function as a solenoid-controlled 3/2 valve and a pressure-controlled 3/2 valve connected in parallel thereto, which in the example shown comprises an inlet 41 and two outlets 43. As will be apparent from the explanations below, the pressure control valve 30 can be operated as a 3/3 valve. However, it is also possible to design the pressure control valve 30 in such a way that its function can be interpreted as a solenoid-controlled 2/2 valve and a pressure-controlled 2/2 valve connected in parallel thereto. In this case, the pressure control valve 30 has one inlet 41 and only one outlet 43. Instead of the first line 32 and the second line 34, there is then only one common line (not shown).

The solenoid-controlled valve has a magnet 44 through which the compressed fluid, in this case the hydraulic fluid, can flow in the example shown. However, it is just as possible to design the magnet 44 in such a way that there is no flow through it. In the exemplary embodiment shown in FIG. 1, the magnet 44 is connected to an external compressed fluid circuit 46, which has a feed pump 48 for conveying the compressed fluid in the external compressed fluid circuit 46. An embodiment in which the magnet 44 is fluidically connected to the primary circuit 14 and/or secondary circuit 20 is not shown. For example, the magnet 44 can be fluidically connected to the pilot pressure chamber 12 and the low-pressure chamber 23.

In FIG. 2, a first embodiment of the proposed pressure control valve $30_1$ is shown on the basis of a partial sectional view. The section X marked in FIG. 2 is shown enlarged in FIG. 3A. Consequently, the following description relates to both FIG. 2 and FIG. 3A. For a better understanding, the pilot pressure chamber 12 and the low-pressure chamber 23 are also shown there.

The pressure control valve $30_1$ comprises a valve housing 50, in which a tappet 52 is mounted so as to be movable along a longitudinal axis L by means of an actuation device that can be energized. In the following, valve housing 50 should be understood to mean all components which in any way form walls and cavities of the pressure valve. The valve housing 50 can have several such components.

Furthermore, the pressure control valve $30_1$ comprises a first seal element 54, which is also mounted in the valve housing 50 such that it can be moved along the longitudinal axis L. The first seal element 54 is preloaded by means of a first spring 56 against a first valve seat 58 (see FIG. 3A), which is also formed by the valve housing 50. The first seal element 54 also forms a passage 60 through which the compressed fluid can flow, which in the illustrated embodiment is designed as an annular gap 62, which is arranged between the first seal element 54 and the tappet 52.

In addition, the proposed pressure control valve $30_1$ comprises a second seal element 64, which is secured to the tappet 52 and can be moved by means of the tappet 52 along the longitudinal axis L between a first position, in which the second seal element 64 rests against the first seal element 54 and closes the passage 60, and a second position, in which the second seal element 64 rests against a second valve seat 66. The second valve seat 66 is formed by a tube 67, which is connected to the valve housing 50, forming a frictional connection. As a result, the tube 67 can be moved along the longitudinal axis L when a sufficiently large force is applied to the tube 67. When the tube 67 is moved, the position of the second valve seat 66 also changes, whereby the opening points of the pressure control valve $30_1$ can be easily changed.

Figure 3A:
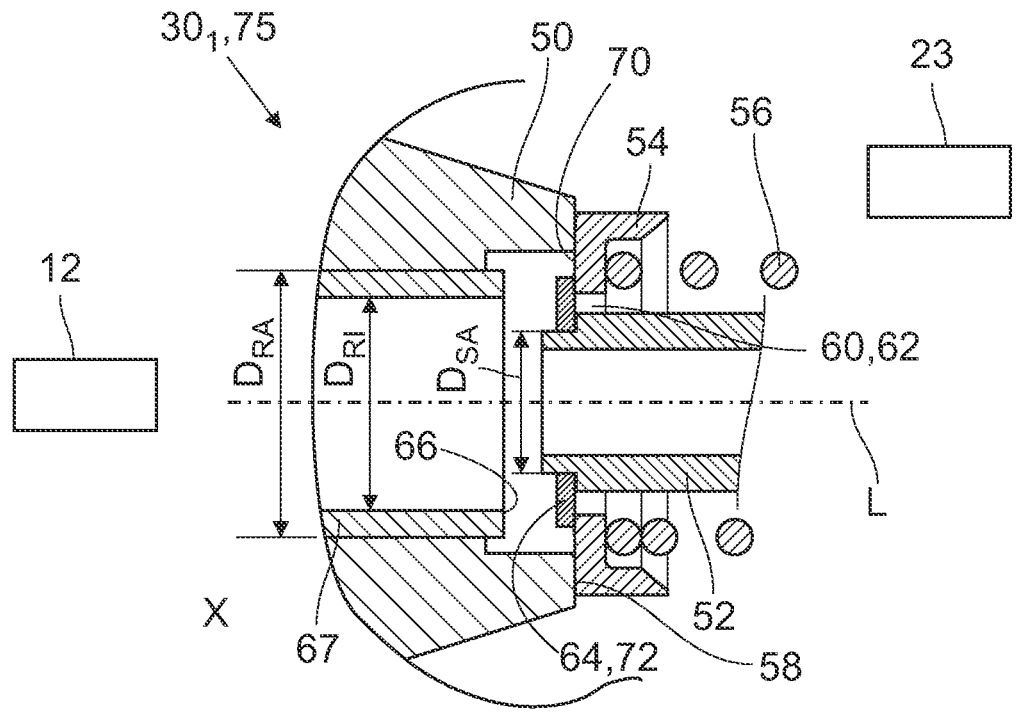
FIG. 3A shows a basic and not-to-scale enlarged illustration of the section X marked in FIG. 2, in which the pressure control valve is in a first operating condition.

As can be seen from FIG. 3A, the tube has an inside diameter $D_{RI}$ and an outside diameter $D_{RA}$. In addition, the tappet 52 has an outside diameter $D_{SA}$ at the end pointing toward the tube 67. In the first exemplary embodiment of the pressure control valve $30_1$, the outside diameter $D_{SA}$ of the tappet 52 is smaller than the inside diameter $D_{RI}$ of the tube 67.

The pressure control valve $30_1$ furthermore comprises a second spring 68 (see FIG. 2), which interacts with the tappet 52 in such a way that the second seal element 64 is preloaded into the first position and is consequently pressed against the first seal element 54. In this respect, the first seal element 54 forms a third valve seat 70 for the second seal element 64 (see FIG. 3A).

The second seal element 64 is designed as a spring plate 72, which is fastened to the tappet 52 by means of a clearance fit. The clearance fit is designed in such a way that the spring plate 72 can be moved to a minimal extent both along the longitudinal axis L and perpendicular thereto. The fastening can take place by press-fitting the tappet 52 at the end. The spring plate 72 has a thickness of 0.1 to 0.5 mm.

Figure 3B:
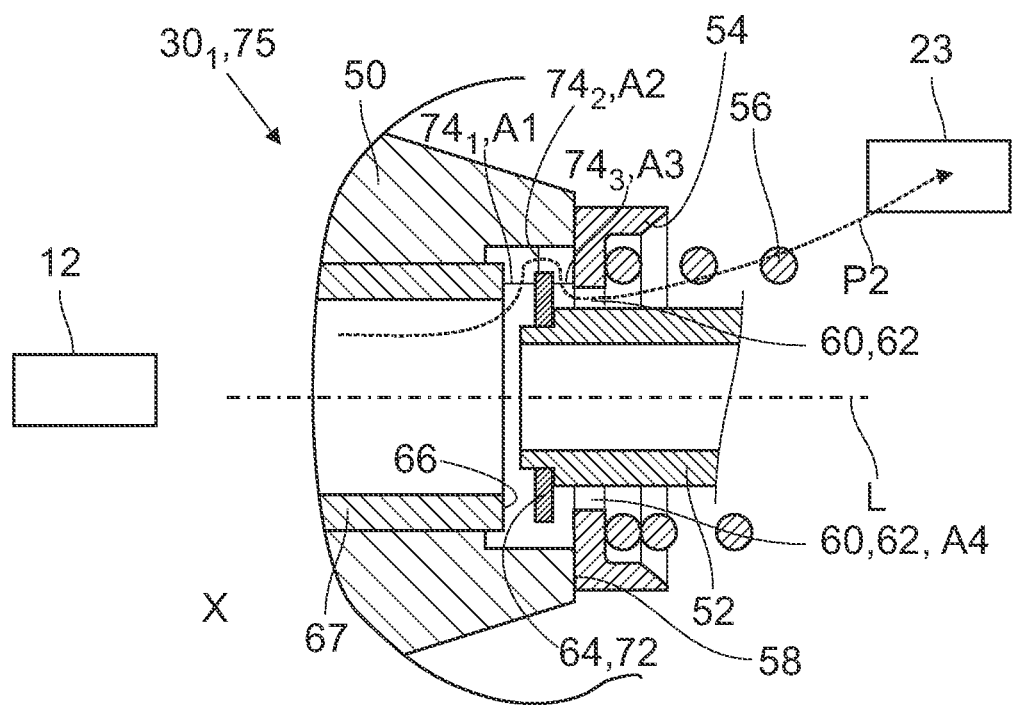
FIG. 3B shows a basic and not-to-scale enlarged illustration of the section X marked in FIG. 2, in which the pressure control valve is in a second operating condition.
Figure 3C:
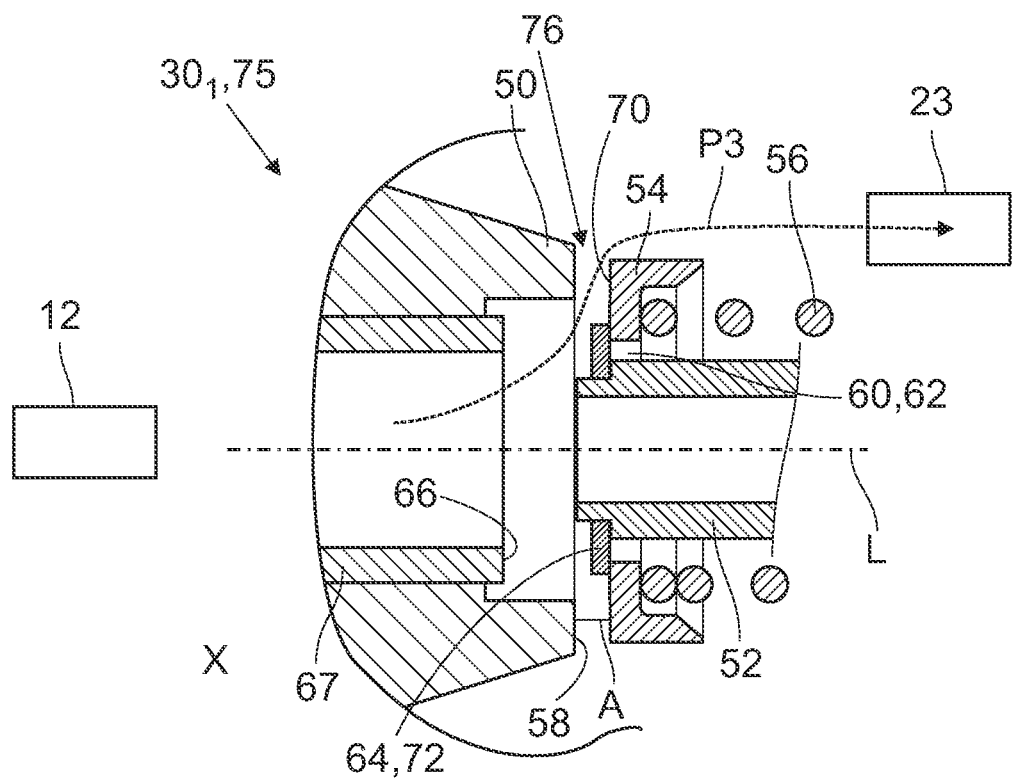
FIG. 3C shows a basic and not-to-scale enlarged illustration of the section X marked in FIG. 2, in which the pressure control valve is in a third operating condition.

In FIG. 2 and FIG. 3A, the pressure control valve $30_1$ is in a first operating condition, while the pressure control valve $30_1$ in FIG. 3B and FIG. 3C, which analogously represent the section X marked in FIG. 2, is in a second and third operating condition respectively.

In FIG. 3A, the device 10 is in the unpressurized state, in which the first seal element 54 is pressed against the first valve seat 58 by means of the first spring 56, and the second seal element 64 is pressed against the first seal element 54 by means of the second spring 68. The compressed fluid can consequently not flow through the pressure control valve $30_1$, so that the second valve seat 66 is also closed indirectly.

In FIG. 3B, the pressure control valve $30_1$ is in a second operating condition, which corresponds to the intended operation of the pressure control valve $30_1$. Due to the energization of the actuation device 53, the tappet 52 is displaced to the left in relation to FIGS. 2 to 3C, with the result that the second seal element 64 moves away from the first seal element 54 and consequently no longer closes the passage 60. The compressed fluid, which is conveyed by the working machine 16 through the secondary circuit 20, can consequently flow through the pressure control valve $30_1$ as indicated by the arrow P2 in FIG. 3B and thus reach the low-pressure chamber 23. Based on a flow directed parallel to the longitudinal axis L when entering the pressure control valve $30_1$ and when flowing through the first valve seat 66, the compressed fluid is first deflected radially outward by the second seal element 64, wherein it must flow through a first throttle gap $74_1$. The compressed fluid is then deflected in such a way that it flows substantially parallel to the longitudinal axis L, wherein it has to flow through a second throttle gap $74_2$. Thereafter, the compressed fluid is deflected radially inward, so that it flows through a third throttle gap $74_3$ before it enters the passage 60 with a flow directed substantially parallel to the longitudinal axis L. After the compressed fluid has flowed through the passage 60, it enters the low-pressure chamber 23.

The first throttle gap $74_1$, the second throttle gap $74_2$ and the third throttle gap $74_3$ extend from the second seal element 64. The first throttle gap $74_1$ has a first cross-sectional area A1 running substantially parallel to the longitudinal axis L and is formed between the second valve seat 66 and the second seal element 64. The second throttle gap $74_2$ has a second cross-sectional area A2, which runs substantially perpendicular to the longitudinal axis L and which is formed between the second seal element 64 and the valve housing 50. The third throttle gap $74_3$ has a third cross-sectional area A3 which runs substantially parallel to the longitudinal axis L and which is formed between the second seal element 64 and the first seal element 54.

A comparison of FIG. 3A and FIG. 3B shows that before the start of the energization, the third cross-sectional area A3 is equal to zero and thus the passage 60 is closed. If the energization is now started, the tappet 52 together with the second seal element 64 move away from the first seal element 54 and toward the second valve seat 66. This has the consequence that the third cross-sectional area A3 increases, while the first cross-sectional area A1 decreases. Regardless of this, the second cross-sectional area A2 remains constant. Regardless of the size of the first cross-sectional area A1, the second cross-sectional area A2 and the third cross-sectional area A3, the cross-sectional area A4 of the passage 60 is selected so that it is always larger than at least one of the first, second and third cross-sectional areas A1, A2, A3.

For reasons of controllability, it has proven to be advantageous if the throttling is carried out with the first throttle gap $74_1$. The energization of the actuation device 53 must therefore be carried out in such a way that the second seal element 64 is moved as quickly as possible beyond the middle of the distance between the first seal element 54 resting on the first valve seat 58 and the second valve seat 66. This can be achieved by an initial peak current. As soon as the second seal element 64 is located to the left of the center between the first seal element 54 and the second valve seat 66 in relation to the illustration in FIGS. 2 to 3B, the first cross-sectional area A1 of the first throttle gap $74_1$ is the smallest of the first, second and third cross-sectional areas A1, A2, A3, so that the throttling of the compressed fluid is determined by the first throttle gap $74_1$.

When flowing through, the compressed fluid is throttled, the throttling being determined by the throttle gap 74 which has the smallest cross-sectional area A. Depending on how much the compressed fluid is throttled when flowing through the pressure control valve $30_1$, the pressure in the pilot pressure chamber 12 also changes. The more it is throttled, the more the pressure in the pilot pressure chamber 12 increases. The throttling can take place continuously and depends on the strength of the energization of the actuation device 53. Since the volume flow is also influenced by the pressure control valve $30_1$ as a result of the throttling and can be continuously adjusted, the pressure control valve $30_1$ is designed as a proportional valve 75.

With reference to FIG. 1, the effect of the pressure in the pilot pressure chamber 12 on the slider 24 will now be explained. In the event that the pressure in the pilot pressure chamber 12 is greater than or equal to the pressure upstream of the slider 24 in the primary circuit 14, the slider 24 remains in the position shown in FIG. 1, so that the primary circuit 14 is blocked between the branch 18 and the confluence 22. A fluid connection between the branch 18 and the confluence 22 is only given via the secondary circuit 20. However, in order to facilitate the opening of the slider 24, the main orifice 28 is provided downstream of the slider 24 in the secondary circuit 20, which causes the pressure downstream of the slider 24 in the secondary circuit 20 to drop at least slightly. If the pressure in the pilot pressure chamber 12 also falls due to the above-described energization of the actuation device 53 and the throttling of the compressed fluid caused by this, the slider 24 can open and unblock the primary circuit 14 between the branch 18 and the confluence 22. As mentioned, the slider 24 is designed as a proportional slider 26, which means that the slider 24 more or less unblocks the primary circuit 14 between the branch 18 and the confluence 22 depending on the pressure in the pilot pressure chamber 12. Thus, the volume flow between the branch 18 and the confluence 22 can be set proportionally to the pressure in the pilot pressure chamber 12 by energizing the actuation device 53.

A third operating condition of the pressure control valve $30_1$ is shown in FIG. 3C, in which no electrical energy is available for energizing the actuation device 53. In this case, the second spring 68 (see FIG. 2) puts the second seal element 64 back into the first position, in which the second seal element 64 rests on the first seal element 54 and closes the passage 60. This intermediate position is similar to the first operating condition shown in FIG. 3A. However, since the working machine 16 is active in the third operating condition, in contrast to the first operating condition, the compressed fluid exerts pressure on the first seal element 54 and the second seal element 64 and on the end face of the tappet 52. As a result, the tappet 52 together with the first seal element 54 and the second seal element 64 is moved to the right in relation to the illustrations of FIGS. 2 to 3C, the first spring 56 being compressed. The first seal element 54 is consequently moved away from the first valve seat 58, so that a gap 76 opens there, through which the compressed fluid can flow and consequently reach the low-pressure chamber 23 (arrow P3). Depending on the cross-sectional area A of this gap 76, the compressed fluid is throttled to a greater or lesser extent when it flows through the pressure control valve $30_1$. The size of the cross-sectional area A of the gap 76 can be adjusted with the spring preload and the spring constant of the first spring 56. Consequently, even if the actuation device 53 fails, it is ensured that the slider 24 opens and the primary circuit 14 is unblocked between the branch 18 and the confluence 22. As already explained, the extent to which the slider 24 opens depends on the strength of the throttling. Consequently, in the event of a failure of the supply of the actuation device 53 with electrical energy, the degree of when and how far the slider 24 opens can be selected with the spring preload and the spring constant of the first spring 56.

FIG. 4 shows a second embodiment of the pressure control valve $30_2$ according to the invention based on the illustration selected in FIG. 3A, also in the unpressurized state. The basic structure of the pressure control valve $30_2$ according to the second embodiment largely corresponds to the structure of the pressure control valve according to the first embodiment $30_1$, which is why only the differences are discussed below.

In the second embodiment of the pressure control valve $30_2$, the spring plate 72 is press-fit with the tappet 52, although a certain axial movability is provided. The end of the tappet 52 pointing toward the tube 67 is arranged at a greater distance from the spring plate 72 than in the first embodiment of the pressure control valve $30_1$. In addition, the outside diameter $D_{SA}$ of the tappet 52 is larger than the inside diameter $D_{RI}$, but smaller than the outside diameter $D_{RA}$ of the tube 67. It follows from this that, in contrast to the first embodiment of the pressure control valve $30_1$, the first throttle gap $74_1$ is not formed starting from the second seal element 64, but starting from the end of the tappet 52 pointing toward the tube 67. As mentioned, it has proven to be advantageous for reasons of controllability if the throttling is carried out with the first throttle gap $74_1$. It is clear from this that in the second embodiment of the pressure control valve $30_2$ the throttling is carried out with the tappet 52 and not, as in the first embodiment of the pressure control valve $30_1$, with the second seal element 64.

In FIG. 5, a third embodiment of the proposed pressure control valve $30_3$ is again based on the illustration selected in FIG. 3A in the unpressurized state. In the third embodiment of the pressure control valve $30_3$, the spring plate 72 is secured axially on the tappet 52 with a driver element 71. In the third embodiment of the pressure control valve $30_3$, too, a certain axial movability of the spring plate 72 is provided.

The driver element 71 protrudes axially beyond the end of the tappet 52 pointing toward the tube 67. At the end facing the tube 67, the driver element 71 has an outside diameter $D_{MA}$, which is larger than the inside diameter $D_{RI}$ but smaller than the outside diameter $D_{RA}$ of the tube 67. The first throttle gap $74_1$ is formed between the second valve seat 66 and the driver element 71. From the above explanations it follows that the pressure control valve 30 according to the invention is operated as a 3/3 valve.

As mentioned, the second line 34 of the secondary circuit splits into the first sub-line 36 and the second sub-line 38 (see FIG. 1). The connected secondary orifice 42 arranged there and the check valve 40 ensure damping of the entire device 10 by absorbing pressure peaks.

Finally, it should be pointed out that the working machine 16 can be configured as a pump 78, a compressor 80 or a vibration damper 82 of a motor vehicle. In particular, in the event that the working machine 16 is designed as a vibration damper 82, it may be necessary to provide hydraulic synchronization so that regardless of the load direction of the vibration damper 82, the fluid is always conveyed in the direction shown in FIG. 1 through the primary circuit 14 and the secondary circuit 20. The device 10 according to the invention can be used for two-tube or three-tube vibration dampers 82.

LIST OF REFERENCE NUMERALS 10 device
12 pilot pressure chamber
14 primary circuit
16 working machine
18 branch
20 secondary circuit
22 confluence
23 low-pressure chamber
24 slider
25 spring
26 proportional slider
27 first control line
28 main orifice
29 second control line
30 pressure control valve
$30_1$-$30_3$ pressure control valve
32 first line
34 second line
36 first sub-line
38 second sub-line
40 check valve
41 inlet
42 secondary orifice
43 outlet
44 magnet
46 external compressed fluid circuit
48 feed pump
50 valve housing
52 tappet
53 actuation device
54 first seal element
56 first spring
58 first valve seat
60 passage
62 annular gap
64 second seal element
66 second valve seat
67 tube
68 second spring
70 third valve seat
71 driver element
72 spring plate
74 throttle gap
$74_1$-$74_3$ first to third throttle gap
75 proportional valve
76 gap
78 pump
80 compressor
82 vibration damper
A cross-sectional area
A1-A4 first to fourth cross-sectional area
$D_{RA}$ outside diameter of the tube
$D_{RI}$ inside diameter of the tube
$D_{SA}$ inside diameter of the tappet
$D_{MA}$ outside diameter of the driver element
L longitudinal axis
P1-P3 arrow

The invention claimed is:

1. A pressure control valve (30) for controlling or regulating a pressure of a compressed fluid in a pilot pressure chamber (12), comprising a valve housing (50) with at least one inlet (41), which can be fluidically connected to the pilot pressure chamber (12), and at least one outlet (43),
a tappet (52), which is mounted in the valve housing (50) so as to be movable along a longitudinal axis (L) by means of an actuation device (53) that can be energized,
a first seal element (54) which is movably mounted along the longitudinal axis (L) in the valve housing (50) and is preloaded by means of a first spring (56) into a closed position, in which the first seal element (54) rests against a first valve seat (58), the first seal element (54) having a passage (60) through which the compressed fluid can flow,
a second seal element (64), which is secured to the tappet (52) and, by energizing the actuation device (53), can be moved by means of the tappet (52) along the longitudinal axis (L) between a first position, in which the second seal element (64) rests against the first seal element (54) and closes the passage (60), and a second position, in which the second seal element (64) rests against a second valve seat (66), the second valve seat (66) being arranged axially offset to the first valve seat with respect to the longitudinal axis (L), and
a second spring (68), which preloads the second seal element (64) into the first position.

2. The pressure control valve (30) according to claim 1, characterized in that the passage (60) is formed by an annular gap (62) between the first seal element (54) and the tappet (52).

3. The pressure control valve (30) according to claim 1, characterized in that the second valve seat (66) is formed by a tube (67) connected to the valve housing (50).

4. The pressure control valve (30) according to claim 3, characterized in that the tube (67) is connected to the valve housing (50) to be moved along the longitudinal axis (L).

5. The pressure control valve (30) according to claim 1, characterized in that the cross-sectional area (A4) of the passage (60) or the annular gap (62) is larger than the cross-sectional area of a throttle gap (74) emanating from the second seal element (64).

6. The pressure control valve (30) according to claim 5, characterized in that the cross-sectional area (A4) of the annular gap (62) is larger than the cross-sectional area (A1, A2, A3)
of the first throttle gap ($74_1$) formed between the second seal element (64) and the second valve seat (66), or
the second throttle gap ($74_2$) formed between the second seal element (64) and the valve housing (50), or
the third throttle gap ($74_3$) formed between the second seal element (64) and the first seal element (54).

7. The pressure control valve (30) according to claim 1, characterized in that the cross-sectional area (A4) of the passage (60) or the annular gap (62) is larger than the cross-sectional area of a throttle gap (74) emanating from the second seal element (64) or from the tappet (52).

8. The pressure control valve (30) according to claim 7, characterized in that the cross-sectional area (A4) of the annular gap (62) is larger than the cross-sectional area (A1, A2, A3)
the first throttle gap ($74_1$) formed between the tappet (52) and the second valve seat (66), or the second throttle gap (74₂) formed between the second seal element (64) and the valve housing (50), or the third throttle gap (74₃) formed between the second seal element (64) and the first seal element (54).

9. The pressure control valve (30) according to claim 1, characterized in that the second valve seat (66) is enclosed by the first valve seat (58).

10. The pressure control valve (30) according to claim 1, characterized in that the pressure control valve (30) is designed as a proportional valve (75).

11. The pressure control valve (30) according to claim 1, characterized in that the second seal element (64) is designed as a spring plate (72).

12. The pressure control valve (30) according to claim 1, characterized in that the second seal element (64) is connected to the tappet (52) by means of a clearance fit.

13. The pressure control valve (30) according to claim 11, characterized in that the spring plate (72) is press-fit on the tappet (52).

14. The pressure control valve (30) according to claim 11, characterized in that the spring plate (72) is secured to the tappet (52) by means of a driver element (71).

15. The pressure control valve (30) according to claim 8, characterized in that the driver element (71) is secured to the tappet (52) in such a way that the first throttle gap (741) is formed between the driver element (71) and the second valve seat (66).

16. The pressure control valve (30) according to claim 1, characterized in that the actuation device (53) comprises a magnet (44) through which the compressed fluid can flow.

17. A device for controlling and regulating pressure in a pilot pressure chamber (12), comprising a primary circuit (14) for a compressed fluid, a working machine (16) arranged in the primary circuit (14) for conveying the compressed fluid in the primary circuit (14) along a conveying direction, a hydraulic or pneumatic slider (24), a secondary circuit (20) for the compressed fluid, which starts from a branch (18) of the primary circuit (14), which branch is arranged downstream of the working machine (16) with respect to the conveying direction, and which flows back into the primary circuit (14) at a confluence (22), a pilot pressure chamber (12) arranged in the secondary circuit (20), and a pressure control valve (30) according to one of the preceding claims, arranged between the pilot pressure chamber (12) and the confluence (22) in the secondary circuit (20), wherein the slider (24) is arranged and designed so that the slider (24) can block or unblock the flow of the compressed fluid in the primary circuit (14) between the branch (18) and the confluence (22) depending on the pressure in the pilot pressure chamber (12).

18. The device according to claim 17, characterized in that the slider (24) is designed as a proportional slider (26).

19. The device according to claim 17, characterized in that the actuation device (53) of the pressure control valve (30) comprises a magnet (44), through which the compressed fluid can flow and the magnet (44) is fluidically connected to the pilot pressure chamber (12) or to an external compressed fluid circuit (46).

20. The device according to claim 17, characterized in that the working machine (16) is a pump (78), a compressor (80) or a vibration damper (82).

\* \* \* \* \*